(12) United States Patent
Molayem

(10) Patent No.: US 8,393,262 B1
(45) Date of Patent: Mar. 12, 2013

(54) PRESSURE COOKER WITH PRESSURE RELIEF HANDLE

(75) Inventor: Daryoosh Molayem, Beverly Hills, CA (US)

(73) Assignee: Table Unlimited, Inc., Carson, CA (US)

( * ) Notice: Subject to any disclaimer, the term of this patent is extended or adjusted under 35 U.S.C. 154(b) by 595 days.

(21) Appl. No.: 12/471,004

(22) Filed: May 22, 2009

(51) Int. Cl.
*A47J 27/08* (2006.01)
*A47J 27/092* (2006.01)

(52) U.S. Cl. ............. 99/337; 99/403; 219/440; 220/316

(58) Field of Classification Search .................... 99/337, 99/330, 332, 339, 403; 219/431, 433, 439, 219/440, 441; 220/316, 367.1, 231, 203.27, 220/203.29
See application file for complete search history.

(56) References Cited

U.S. PATENT DOCUMENTS

| | | | | |
|---|---|---|---|---|
| 3,769,902 A * | 11/1973 | Hurwitz | ......................... | 99/472 |
| 4,617,452 A * | 10/1986 | Miwa | ............................ | 219/441 |
| 5,293,813 A * | 3/1994 | Schultz | ........................... | 99/337 |
| 6,067,896 A * | 5/2000 | Elorza | ............................. | 99/337 |
| 6,173,643 B1 * | 1/2001 | Qian et al. | ..................... | 99/339 |
| 6,178,876 B1 * | 1/2001 | Kao | ................................. | 99/332 |
| 6,283,014 B1 * | 9/2001 | Ng et al. | ......................... | 99/330 |
| 6,513,420 B1 * | 2/2003 | Park | ................................ | 99/337 |

* cited by examiner

*Primary Examiner* — Reginald L Alexander
(74) *Attorney, Agent, or Firm* — Blakely, Sokoloff, Taylor & Zafman, LLP

(57) ABSTRACT

A pressure cooking vessel has a lid and a container. A handle is coupled to the lid and not the container. A pressure relief mechanism is integrated in the handle. Various other embodiments are also described and claimed.

17 Claims, 4 Drawing Sheets

PRESSURE COOKER WITH PRESSURE RELIEF HANDLE

BACKGROUND

1. Field

An embodiment of this invention relates to a low pressure cooker having a lid with an integrated pressure relief handle. Other embodiments are also described.

2. Background

Pressure cookers are sealed vessels that cook foods at elevated pressures. Typically, the food to be cooked is placed into the vessel through its open top along with a small amount of water. A lid is then locked into place which seals closed the open top. Then, as the vessel is heated, and its internal temperature rises, the pressure inside the vessel also rises above normal atmospheric. Because the boiling point of water increases as the pressure increases, the pressure built up inside the cooker allows the liquid inside to rise to a higher temperature without boiling. Foods are therefore cooked much faster, with additional benefits including the use of less water and a richer flavor.

Most pressure cookers have a relief valve embedded in the lid which automatically opens and closes to regulate the pressure, releasing steam to prevent the pressure from rising above an upper limit and then closing to allow the pressure to build back up. An additional valve is also provided as a backup pressure relief valve should the regulator valve fail, which opens to release steam when the pressure reaches a maximum desirable level.

When it is time to remove the food from the hot vessel, it may be necessary for the user to first manually actuate the regulator or backup relief valve to drop the pressure down closer to normal atmospheric. This makes the lid locking mechanism easier to open (with less force by the user), as well as avoids food spillage when opening the lid.

BRIEF DESCRIPTION OF THE DRAWINGS

The following illustration is by way of example and not by way of limitation in the figures of the accompanying drawings in which like references indicate like elements. It should be noted that references to "an" or "one" embodiment in this disclosure are not necessarily to the same embodiment, and such references mean at least one.

DETAILED DESCRIPTION

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

Figure 1:
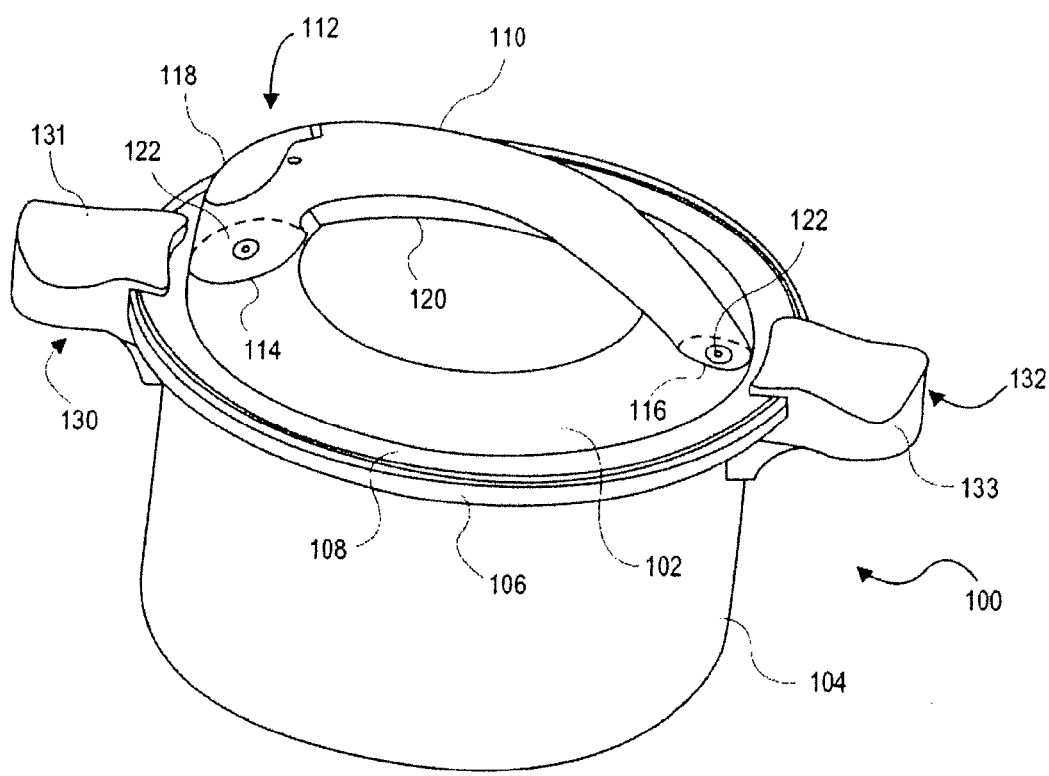
FIG. 1 is a perspective view of a pressure cooking vessel in a closed configuration according to an embodiment of the invention.

FIG. 1 illustrates a pressure cooking vessel 100. In some embodiments, the pressure cooking vessel 100 may be a low pressure cooking vessel or low pressure cooker. The phrases "low pressure cooking vessel" and "low pressure cooker" are used interchangeably herein to refer to a cooking vessel suitable for cooking food items in a range between 8 pounds per square inch (psi) and 15 psi.

The pressure cooking vessel 100 includes a lid 102 and a container 104 suitable for cooking food items. For example, the container 104 may include, but is not limited to, a pot, a pan, a crock, a deep dish, a bowl or any similar container vessel. The container 104 may be made mostly of any material which will not fail or otherwise deform under the pressures and temperatures typically used for pressure cooking. Suitable materials may include, but are not limited to metals such as steel, stainless steel, aluminum, aluminum alloy, or copper.

In order to allow pressure to build up within the container 104 as the container is heated, the lid 102 is provided with a shape and dimensions suitable for covering and sealing an open end of the container 104. For example, the lid 102 may have a rim 108 dimensioned to sit within a receiving lip 106 of the container 104 that surrounds the open end, so that the lid 102 rests on the container 104 in the closed position and creates an essentially airtight seal. Although the rim 108 and the receiving lip 106 are described, other complimentary arrangements may exist that allow the lid 102 to rest on the container 104. The lid 102 may be made of the same or a different material than that of the container 104. Representative materials may include, but are not limited to glass, ceramic, or metal such as steel, stainless steel, aluminum, aluminum alloy and copper. In some embodiments, the lid 102 may be made of a combination of materials, for example, the lid 102 may be a metal lid with a glass center so that the contents of the container 104 can be viewed.

In order to modify (i.e., decrease or increase) the pressure within the pressure cooking vessel 100, a handle 110 having an integrated pressure relief mechanism 112 is attached to the lid 102. In the example shown in the figures, the handle 110 has an elongated body that extends across a center of the lid 102 and is connected to the lid 102 at one or more anchor points 122. In one embodiment, the handle 110 is connected to the lid 102 at two anchor points 122, one at a first end 116 of the handle body and another at an opposite end 114 of the handle body. In this aspect, a center portion of the handle body is raised above the lid 102 so that a user's fingers can fit between the handle 110 and the lid 102 to grasp the handle 110. For example, the handle body may have an arcuate shape as illustrated in FIG. 1 or any other shape suitable for gripping by a hand of the user.

The body of the handle 110 should be made of a material and have a structure that minimizes heat conduction from the lid 102. A non-slip material or substance may be applied to the grip surfaces to increase fraction control and absorb perspiration and general moisture. Representative materials may include, but are not limited to rubber, polyurethane, and polyvinyl. Additional aspects of the handle 110, including the integrated pressure relief mechanism, will be described further below.

The lid 102 may be secured or locked to the container 104 to ensure that pressure can build up inside the container 104, using a lid locking mechanism 130, 132. In some embodiments, a "bayonet" type locking system may be used to lock the lid 102 to the container 104. In this aspect, the lid 102 may have a number of circumferentially spaced flanges, which interlock with similar flanges on the container 104 when the lid 102 is rotated relative to the container 104. The locking mechanisms 130, 132 may include a body portion 131, 133 dimensioned to be gripped by the user (e.g., to serve as a handle for the container) and a recess, respectively, formed along one side of each body portion. The lid locking mechanisms 130, 132 are independent from the integrated pressure relief mechanism in that the two are not directly linked. For example, the user's manual actuation of the pressure relief mechanism to relieve pressure in the cooking vessel 100 does not simultaneously unlock the lid.

Figure 2:
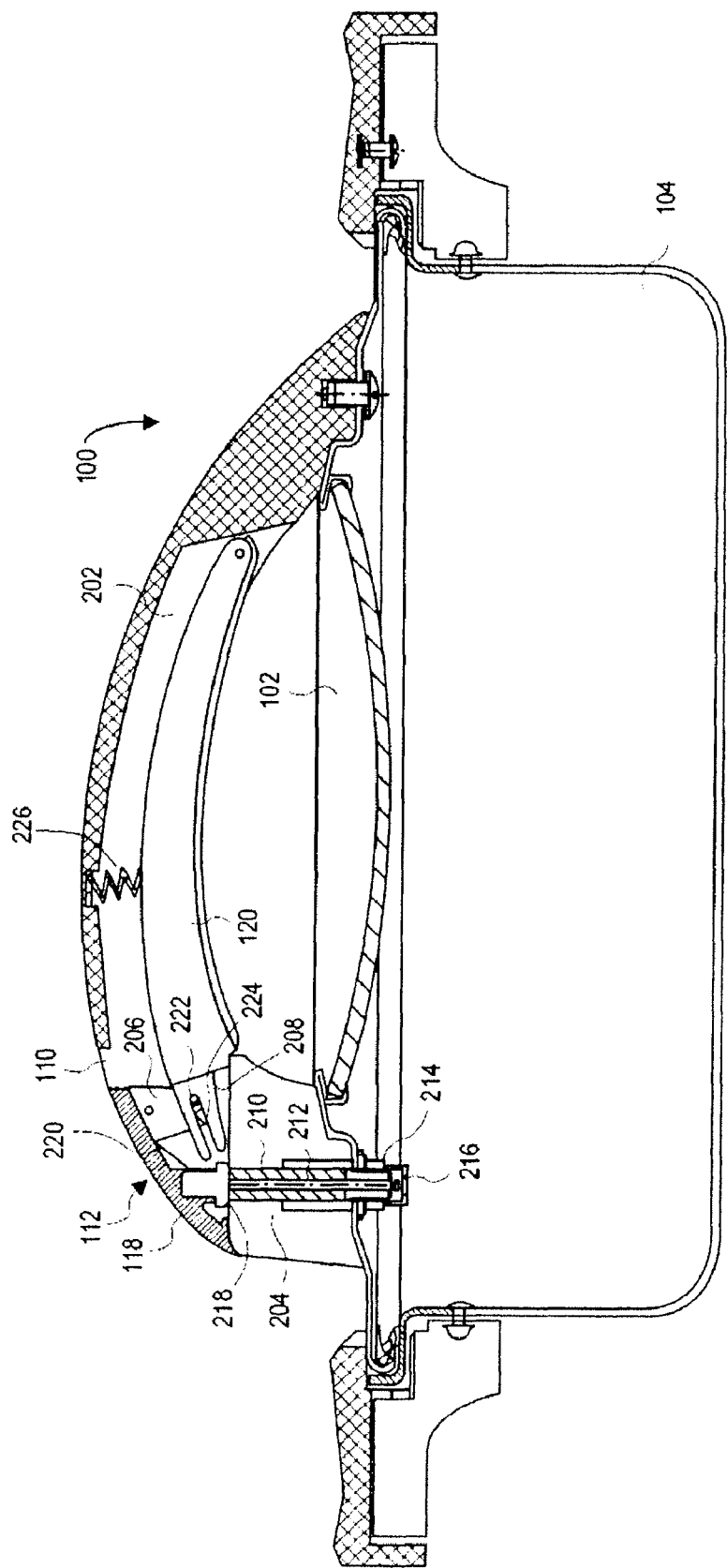
FIG. 2 is a side cutaway view of the pressure cooking vessel.

FIG. 2 illustrates a cut away view of the pressure cooking vessel 100. From this perspective, the components of one example of the pressure relief mechanism 112 can be seen. In this embodiment, the pressure relief mechanism 112 is located in a cavity 202 of the body of the handle 110. The pressure relief mechanism 112 may include a user actuatable valve 204, a valve cover 118, a lever 120, a pivot arm 206, and a guide 208. The functions and example physical forms of each of these items are now described.

The user actuatable valve 204 opens and closes to control the pressure in the container 104, based on the actions of the user. The user actuatable valve 204 has a valve body 210, a moveable valve member 212 located therein, and a fixed valve member 214. The valve body 210 is defined, in this example, by a cylinder that is open at each end and that is integrated or embedded in the body of the handle 110. The open ends define an intake port 216, which receives gas or vapor pressure from the container 104, and a release port 218 that expels the gas or vapor pressure to the atmosphere through a venting region 220 of the cavity 202 within the body of the handle 110. As will be described more fully in reference to FIGS. 3a and 3b, the moveable valve member 212 is located inside the valve body and engages the fixed valve member 214 when closed, thereby creating a seal to prevent the expulsion of gas or vapor through the release port 218, thereby enabling pressure inside the container 104 to increase when heat is applied to the pressure cooking vessel 100. The user actuable valve 204 may be any type of valve capable of withstanding the pressure necessary to cook food in a pressure cooker. The user actuatable valve 204 may be a gate, a poppet, a plug, a globe, a check, a butterfly, a diaphragm, a ball, a needle, or a pinch valve.

The valve cover 118 may be pivotally coupled to the body of the handle 110 such that it may pivot between an open and a closed position. In the closed position, the valve cover 118 blocks, but may or may not seal, the venting region 220 of the cavity 202. In the open position, the valve cover 118 unblocks the venting region 220 to the outside atmosphere thereby allowing escaping gas and/or vapor that has been released by the user actuatable valve 204 to be directed to the side of the vessel 100 rather than vertically above the handle 110. In addition, in this embodiment, the valve cover 118 is coupled to the moveable valve member 212 so that when it pivots to the open position, it forces the valve member 212 to disengage from the fixed valve member 214 so as to open the valve 204. The valve cover 118 may be made of a material that does not conduct heat, for example, plastic or ceramic.

The lever 120 may be pivotally coupled to the body of the handle 110 to pivot about a first end that is located away from the valve 204. The lever 120, in this example, is elongated, as is the body of the handle, and is aligned longitudinally with the body of the handle 110 such that when the user grips the handle 110, the user's fingers wrap around the lever 120 in a transverse direction and the user is able to squeeze an activation surface of the lever 120. Alternatively, the lever 120 may be a button that is positioned such that it floats between activated and inactivated positions. A spring mechanism 226 biases the lever 120 into a default position, which is associated with the valve 204 being closed. The lever 120 may be rigid so as to withstand the force applied by the hand of the user without bending. The lever 120 may be made of the same or different material than that of the handle 118. Representatively, in some embodiments, the lever 120 may be made of a material that does not conduct heat, for example, plastic or ceramic.

The guide 208 is linked or attached to the lever 120 at a second end of the lever 120 that is located near the valve 204. The guide 208 mechanically links the lever 120 to a pivot arm 206. In one embodiment, the guide 208 is slotted, into which a pin or dowel 222 that is fixed to the pivot arm 206 is inserted. Representatively, in some embodiments, the guide 208 may be made of a material that can withstand the force applied by the hand of the user and is also rust and corrosion resistant, for example, stainless steal, plastic, or ceramic materials.

The pivot arm 206 is pivotally coupled to a wall of the cavity 202 such that the pivot arm 206 may pivot about a first end. A second, opposite end of the pivot arm 206 is coupled to the guide 208 via the pin or dowel 222, which protrudes from the second end of the pivot arm 206. The pin 222 is sized to be received within a slot of the guide 208. The pin 222 and the slot are dimensioned to allow the pin 222 to move and be guided in the slot, as the lever 120 moves. In other embodiments, the pivot arm 206 is coupled to the lever 120 through more restrictive coupling methods, which do not provide as much freedom of movement between the two. For example, the pivot arm 206 may be rigidly fixed to the lever 120 via welding, or it could be integrally molded with the lever 120. Representatively, in some embodiments, the pivot arm 206 may be made of a material that can withstand the force applied by the hand of the user against the lever 120, so as not to bend, and is also rust and corrosion resistant, for example, stainless steal, plastic, or ceramic materials.

As will be described more fully in reference to FIGS. 3a and 3b, to modify the pressure within the pressure cooking vessel 100, the user applies force to the user activation surface of the lever 120, which in turn moves the mechanical linkage of the guide 208 and the pin 222 so that the captured pin 222 is guided upward, thereby pivoting the arm 206; the latter may be rigidly connected to the valve cover 118 so that pivoting the arm 206 moves outward and raises the valve cover 118, which in turn opens the valve 204, allowing steam to be released (and thereby decreasing the pressure within the pressure cooking vessel 100). Once pressure inside the closed container has been relieved in this manner, the user can more easily open the container (by separately actuating the lid locking mechanism 130, 132 which has been "freed up" due to the drop in pressure inside the closed container).

Figure 3A:
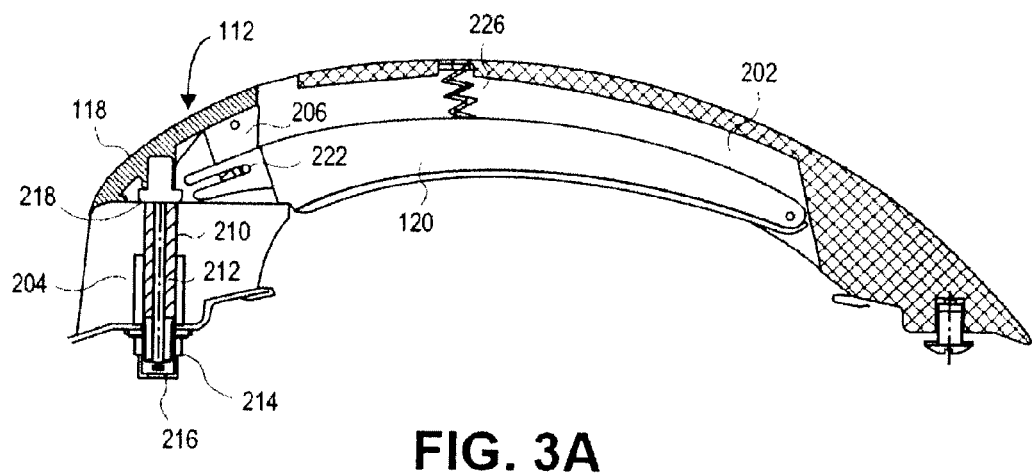
FIG. 3a is a side cutaway view of a pressure relief mechanism in a default position according to an embodiment of the invention.
Figure 3B:
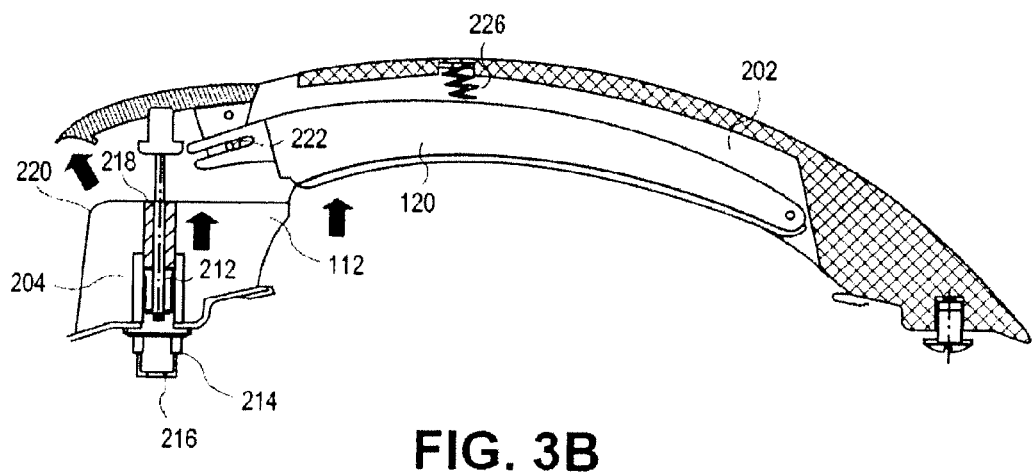
FIG. 3b is a side cutaway view of the pressure relief mechanism in an activated position.

FIGS. 3a and 3b illustrate a default position 300 and an activated position 300' of pressure relief mechanism 112, respectively. The default position 300 maintains the pressure in the pressure cooking vessel 100 or allows pressure to build up, when no force is being applied by the hand of the user to move the lever 120. In the default position 300 the lever 120 is fully extended toward the lid 102, and the pressure relief mechanism 112 seals the container 104 from the outside atmosphere. Here, the user actuatable valve 204 is in a first position wherein the moveable valve member 212 has essentially closed off (air tight) an opening with the fixed valve member 214. This air tight connection prevents the escape of gas or vapor from the container 104 through the intake port 216 and the relief port 218. Further, the valve cover 118 in the default position 300 covers the venting region 220 of the cavity 202.

Upon the continuous application of force to the lever 120 by the hand of the user, the lever 120 moves away from the lid 102 (and is held there so long as the user does not release his grip). This movement of the lever 120 causes the pressure relief mechanism 112 to move to its activated position 300' (FIG. 3b). In the activated position 300', the pressure relief mechanism 112 allows the pressure in the pressure cooking vessel 100 to reduce by allowing the flow of gas or vapor from the pressure cooking vessel 100 to escape to the outside atmosphere. Specifically, the user actuatable valve 204 is moved from the first position, which is shown in FIG. 3a, to the second position, which is shown in FIG. 3b. In the second position, the moveable valve member 212 no longer forms an air tight connection through an opening with the fixed valve member 214. A channel is thus opened between the container 104 and the outside atmosphere through the intake port 216 and the relief port 218. The channel allows gas and vapor to escape from the container 104 to the outside atmosphere. Further, the valve cover 118 is no longer blocking the venting region 220 of the cavity 202 such that the gas or vapor released from the user actuatable valve 204 may freely dissipate into the outside atmosphere.

Upon release of the lever 120 by the hand of the user, the pressure relief mechanism 112 automatically transitions back to the default position 300. This automatic transition may be initiated by the spring mechanism 226 that couples the lever 120 to the body of the handle 110. In moving to the default position 300, the lever 120 rotates toward the top of the lid. This movement of the lever 120, through the mechanical linkage embedded in the body of the handle described above, causes the pressure relief mechanism 112 to seal off the flow of gas or vapor from the pressure cooking vessel 100 to the outside atmosphere. Further, the valve cover 118 moves downward to again block the venting region 220 of the cavity 202.

Figure 4:
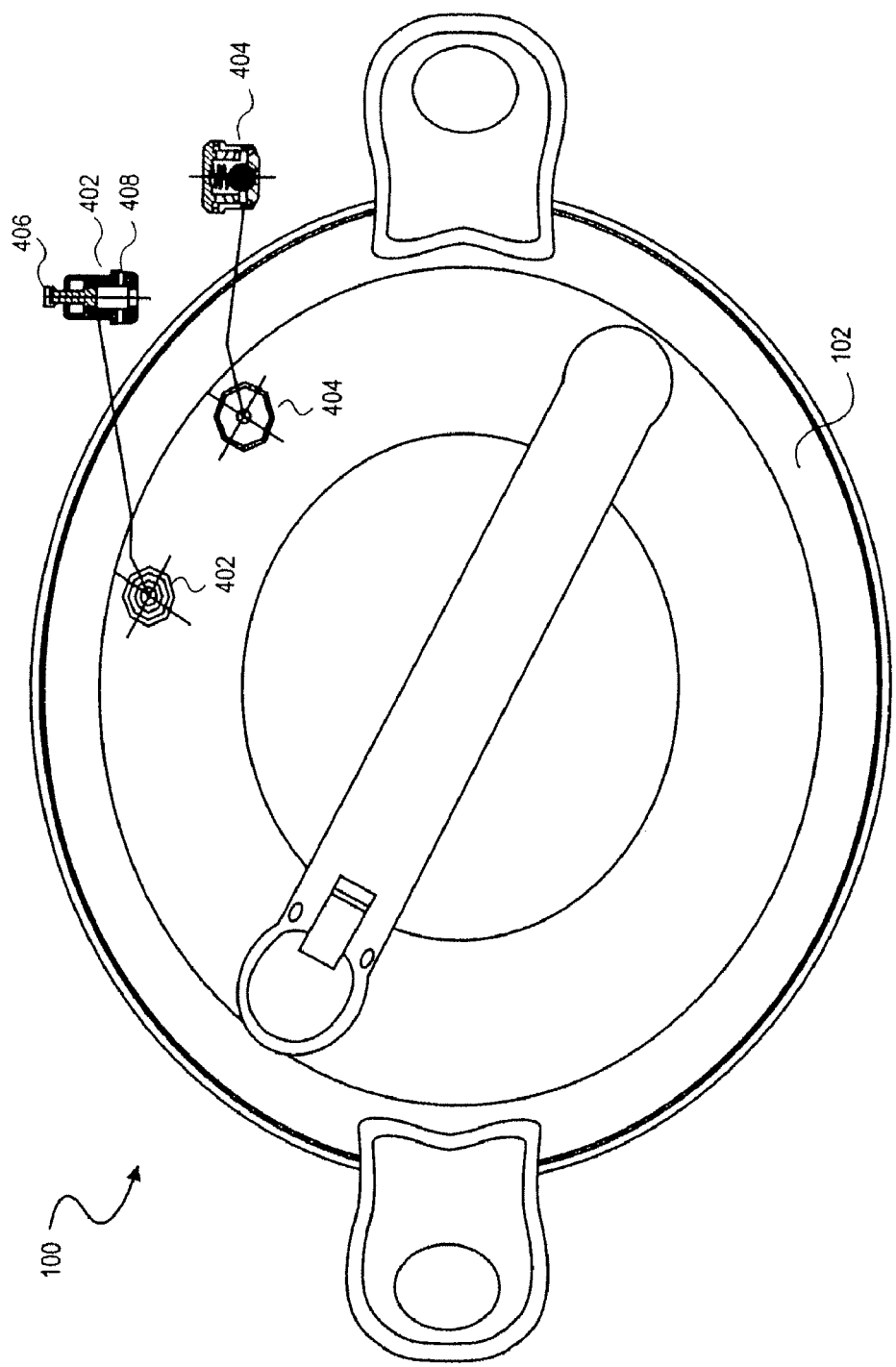
FIG. 4 is a top view of the pressure cooking vessel in a closed configuration according to an embodiment of the invention.

FIG. 4 illustrates a top view of the pressure cooking vessel 100. In this embodiment, a pair of additional valves 402 and 404 are embedded in the lid 102, to act as a pressure regulator and as a backup pressure relief device, respectively. These include a regulator valve 402 e.g., made up of a weighted pin 406 whose weight holds it down within a passageway so as to close off one or more relief holes 408 that open to the interior of the pressure cooking vessel 100, until the pressure inside the container rises to a predetermined level that is sufficient to lift the weighted pin 406, without intervention from the user, beyond relief holes 408, thereby relieving the pressure inside the container (by allowing the steam to be released from the pressure cooking vessel 100). The predetermined pressure suitable for raising the weighted pin 406 may be, for example, in the range of 8-15 psi. The other valve 404 may be a backup pressure relief valve, which opens (to relieve the pressure inside the closed container) in the event the regulator valve 402 is stuck closed and the pressure has risen to an unacceptably high level (e.g. >15 psi).

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A low pressure cooker comprising:
a cooking vessel having a container and a lid; and
a handle coupled to the lid and not the container, the handle having an elongated handle body, and a pressure relief mechanism integrated into the handle body,
wherein the pressure relief mechanism comprises an activation surface located in the handle body to allow a user to manually actuate the pressure relief mechanism by applying pressure to the activation surface,
wherein the handle is separated from a top portion of the lid so as to form an area, between the lid and the handle, for fingers of a user to apply pressure to the activation surface and actuate the pressure relief mechanism,
wherein the activation surface comprises a surface of an elongated lever that is a) located in a cavity of the handle body and b) longitudinally aligned with the handle body.

2. The low pressure cooker of claim 1 wherein the pressure relief mechanism comprises:
a pivot arm coupled to the elongated handle body at a first end, wherein the pivot arm pivots about the first end;
a pin attached to a second end of the pivot arm;
a guide coupled to the elongated lever, the guide to receive the pin of the pivot arm; and
a first valve actuatable by the pivot arm between a first position to relieve pressure from the cooking vessel and a second position to at least maintain pressure within the cooking vessel.

3. The low pressure cooker of claim 1 wherein the pressure relief mechanism comprises a spring mechanism coupled to bias the pressure relief mechanism in a closed position that at least maintains pressure in the vessel, until a user applies force to the activation surface which places the pressure relief mechanism in an open position.

4. The low pressure cooker of claim 1, wherein the elongated lever is biased in a default position when no force is applied to the activation surface by a user, so that the pressure relief mechanism automatically at least maintains pressure in the cooking vessel.

5. The low pressure cooker of claim 4, wherein the elongated lever is located on the bottom of the handle body such that the activation surface is facing the top of the lid.

6. The low pressure cooker of claim 1 further comprising:
a regulator valve coupled to the lid and not the handle, the regulator valve being responsive to pressure in the cooking vessel such that it automatically opens when a predetermined pressure within the cooking vessel is reached, to thereby relieve pressure in the vessel.

7. An apparatus comprising:
a low pressure cooking vessel having a lid and a container;
a handle coupled to the lid and not the container; and
a pressure relief mechanism integrated in the handle, the pressure relief mechanism having an elongated user activated surface that is coupled to a first valve to initiate the release of vapor from the vessel, the first valve being actuatable between a first position that relieves pressure in the cooking vessel and a second position that at least maintains pressure within the cooking vessel, wherein the handle comprises a handle body and the user activated surface is accessible through an opening located on a bottom portion of the handle body that is facing the top of the lid and is longitudinally aligned with the handle body.

8. The apparatus of claim 7, wherein the handle comprises a handle body, and wherein the pressure relief mechanism comprises a mechanical linkage housed within a cavity of the handle body and that couples the first valve to the user-activated surface.

9. The apparatus of claim 8 wherein the handle further comprises a movable cover to block a venting region of the cavity through which steam is to be released when the first valve is actuated by a user.

10. The apparatus of claim 8 wherein the mechanical linkage comprises a dowel attached to a free end of a pivot arm, and a guide in which the dowel is captured.

11. The apparatus of claim 7 further comprising:
a second valve coupled to the lid, the second valve being responsive to pressure in the cooking vessel to automatically release vapor from the cooking vessel when a predetermined pressure within the cooking vessel is reached.

12. The apparatus of claim 7 further comprising:
a lid locking mechanism for locking the lid to the container, the lid locking mechanism operable independent from the pressure relief mechanism such that actuation of the first valve to relieve pressure is not directly linked to actuating the lid locking mechanism to unlock the lid.

13. The apparatus of claim 7, wherein the user activated surface is part of a second-class lever.

14. The apparatus of claim 13 further comprising:
a spring coupled to the second-class lever, causing the second-class lever to bias the first valve into the second position.

15. An apparatus comprising:
a low pressure cooking vessel having a container and a lid, and
a handle coupled to the lid and not the container,
a pressure relief mechanism integrated in the handle and having a first valve to be actuated by an elongated lever whose activation surface faces the top of the lid and the activation surface and the top of the lid form an area sufficiently open to allow all the fingers of a user to contact the activation surface, wherein the lever is elongated and is located inside a cavity of the handle body that faces the top of the lid.

16. The apparatus of claim 15 further comprising:
a second valve coupled to the lid, the second valve being responsive to pressure in the cooking vessel such that it automatically relieves pressure from the cooking vessel when a predetermined pressure within the cooking vessel is reached.

17. The apparatus of claim 16 further comprising:
a lid locking mechanism for locking the lid to the container, the lid locking mechanism operable independent from the pressure relief mechanism in that actuation of the lever to relieve pressure is not directly linked to actuation of the lid locking mechanism to unlock the lid.

* * * * *